United States Patent
Kunt et al.

(10) Patent No.: US 10,939,495 B2
(45) Date of Patent: Mar. 2, 2021

(54) METHOD AND APPARATUS FOR HANDLING PACKET DATA CONVERGENCE PROTOCOL DUPLICATION IN MOBILE COMMUNICATIONS

(71) Applicant: MediaTek Inc., Hsinchu (TW)

(72) Inventors: Mehmet Kunt, Cambridge (GB); Pavan Santhana Krishna Nuggehalli, San Jose, CA (US); Pradeep Jose, Cambridge (GB)

(73) Assignee: MediaTek Inc.

(*) Notice: Subject to any disclaimer, the term of this patent is extended or adjusted under 35 U.S.C. 154(b) by 46 days.

(21) Appl. No.: 16/272,629

(22) Filed: Feb. 11, 2019

(65) Prior Publication Data

US 2019/0254116 A1 Aug. 15, 2019

Related U.S. Application Data

(60) Provisional application No. 62/631,277, filed on Feb. 15, 2018.

(51) Int. Cl.
*H04W 80/08* (2009.01)
*H04W 28/06* (2009.01)
(Continued)

(52) U.S. Cl.
CPC ........... *H04W 80/08* (2013.01); *H04W 28/06* (2013.01); *H04W 80/02* (2013.01); *H04L 69/04* (2013.01)

(58) Field of Classification Search
None
See application file for complete search history.

(56) References Cited

U.S. PATENT DOCUMENTS

2015/0215987 A1* 7/2015 Kim ............... H04L 1/1848
370/329
2019/0053325 A1* 2/2019 Yu ................. H04W 76/15
(Continued)

FOREIGN PATENT DOCUMENTS

| CN | 201256395 Y | 6/2009 |
| CN | 108809476 A | 11/2018 |

OTHER PUBLICATIONS

China National Intellectual Property Administration, International Search Report and Written Opinion for International Patent Application No. PCT/CN2019/075046, dated Apr. 28, 2019.
(Continued)

*Primary Examiner* — Ajit Patel
*Assistant Examiner* — Pamit Kaur
(74) *Attorney, Agent, or Firm* — Han IP PLLC; Andy M. Han

(57) ABSTRACT

Various solutions for handling packet data convergence protocol (PDCP) duplication with respect to user equipment and network apparatus in mobile communications are described. An apparatus may determine whether a PDCP entity is associated with two radio link control (RLC) entities. The apparatus may determine whether PDCP duplication is activated. The apparatus may select one of the two RLC entities to transmit a PDCP control protocol data unit (PDU) in an event that the PDCP entity is associated with the two RLC entities and the PDCP duplication is activated.

12 Claims, 4 Drawing Sheets

(51) Int. Cl.
*H04W 80/02* (2009.01)
*H04L 29/06* (2006.01)

(56) References Cited

U.S. PATENT DOCUMENTS

| 2019/0215717 A1* | 7/2019 | Lee | H04W 24/10 |
| 2019/0268799 A1* | 8/2019 | Hong | H04W 40/04 |

OTHER PUBLICATIONS

Huawei et al., Operation for PDCP duplication, 3GPP TSG-RAN WG2 Ad Hoc, Vancouver, Canada, Jan. 22-26, 2018.
Vivo, Remaining issues of PDCP duplication, 3GPP TSG-RAN WG2 Meeting #101, Athens, Greece, Feb. 26-Mar. 2, 2018.
Ericsson, PDCP duplication, 3GPP TSG-RAN WG2 #101, Athens, Greece, Feb. 26-Mar. 2, 2018.
Mediatek Inc., On duplication of PDCP Control PDUs, 3GPP TSG-RAN WG2 #101, Athens, Greece, Feb. 26-Mar. 2, 2018.

* cited by examiner

METHOD AND APPARATUS FOR HANDLING PACKET DATA CONVERGENCE PROTOCOL DUPLICATION IN MOBILE COMMUNICATIONS

CROSS REFERENCE TO RELATED PATENT APPLICATION(S)

The present disclosure is part of a non-provisional application claiming the priority benefit of U.S. Patent Application No. 62/631,277, filed on 15 Feb. 2018, the content of which is incorporated by reference in its entirety.

TECHNICAL FIELD

The present disclosure is generally related to mobile communications and, more particularly, to packet data convergence protocol (PDCP) duplication handling with respect to user equipment and network apparatus in mobile communications.

BACKGROUND

Unless otherwise indicated herein, approaches described in this section are not prior art to the claims listed below and are not admitted as prior art by inclusion in this section.

In New Radio (NR), the duplication of packet data convergence protocol (PDCP) data protocol data units (PDUs) is proposed in multi-connectivity or carrier aggregation to facilitate reliability and reduce latency for ultra-reliable and low latency communications (URLLC). One important aspect of duplication is the detection and discarding of duplicate packets at the receiver. For PDCP Data PDUs, this is achieved by validating the PDCP sequence number of the PDUs at the receiver. However, there is no sequence number defined in the PDU format for the PDCP control PDUs. Therefore, it is not possible for the receiver to detect duplicate PDUs and discard them. It is important to make sure that the duplicate detection will not be a problem for PDCP control PDUs.

Additionally, the PDCP duplication may further affect radio link control (RLC) layer and medium access control (MAC) layer behaviors. It is not clear how the PDCP entity should transmit PDCP control PDUs to the RLC entities, and how to calculate data volume when the PDCP duplication is configured and activated.

Accordingly, how to properly handle the PDCP duplication for PDCP control PDUs may be important in the newly developed communication system. It is needed to provide proper mechanisms to deliver PDCP control PDUs when the the PDCP duplication is configured and activated.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to propose solutions or schemes that address the aforementioned issues pertaining to PDCP duplication handling with respect to user equipment and network apparatus in mobile communications.

In one aspect, a method may involve an apparatus determining whether a PDCP entity is associated with two RLC entities. The method may also involve the apparatus determining whether PDCP duplication is activated. The method may further involve the apparatus selecting one of the two RLC entities to transmit a PDCP control PDU in an event that the PDCP entity is associated with the two RLC entities and the PDCP duplication is activated.

In one aspect, a method may involve an apparatus determining whether PDCP duplication is activated. The method may also involve the apparatus adding a sequence number to a first PDCP control PDU in an event that the PDCP duplication is activated. The method may further involve the apparatus transmitting the first PDCP control PDU.

In one aspect, an apparatus may comprise a transceiver capable of wirelessly communicating with a network node of a wireless network. The apparatus may also comprise a processor communicatively coupled to the transceiver. The processor may be capable of determining whether a PDCP entity is associated with two RLC entities. The processor may also be capable of determining whether PDCP duplication is activated. The processor may further be capable of selecting one of the two RLC entities to transmit a PDCP control PDU in an event that the PDCP entity is associated with the two RLC entities and the PDCP duplication is activated.

In one aspect, an apparatus may comprise a transceiver capable of wirelessly communicating with a network node of a wireless network. The apparatus may also comprise a processor communicatively coupled to the transceiver. The processor may be capable of determining whether PDCP duplication is activated. The processor may also be capable of adding a sequence number to a first PDCP control PDU in an event that the PDCP duplication is activated. The processor may further be capable of transmitting the first PDCP control PDU.

It is noteworthy that, although description provided herein may be in the context of certain radio access technologies, networks and network topologies such as Long-Term Evolution (LTE), LTE-Advanced, LTE-Advanced Pro, 5th Generation (5G), New Radio (NR), Internet-of-Things (IoT) and Narrow Band Internet of Things (NB-IoT), the proposed concepts, schemes and any variation(s)/derivative(s) thereof may be implemented in, for and by other types of radio access technologies, networks and network topologies. Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation in order to clearly illustrate the concept of the present disclosure.

DETAILED DESCRIPTION OF PREFERRED IMPLEMENTATIONS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to PDCP duplication handling with respect to user equipment and network apparatus in mobile communications. According to the present disclosure, a number of possible solutions may be implemented separately or jointly. That is, although these possible solutions may be described below separately, two or more of these possible solutions may be implemented in one combination or another.

In NR, the duplication of PDCP data PDUs is proposed in multi-connectivity or carrier aggregation to facilitate reliability and reduce latency for some specific services (e.g., URLLC). One important aspect of duplication is the detection and discarding of duplicate packets at the receiver. For PDCP Data PDUs, this is achieved by validating the PDCP sequence number of the PDUs at the receiver. However, there is no sequence number defined in the PDU format for the PDCP control PDUs. Therefore, it is not possible for the receiver to detect duplicate PDUs and discard them. It is important to make sure that the duplicate detection will not be a problem for PDCP control PDUs.

Additionally, the PDCP duplication may further affect RLC layer and MAC layer behaviors. It is not clear how the PDCP entity should transmit PDCP control PDUs to the RLC entities, and how to calculate data volume when the PDCP duplication is configured and activated. In view of the above, the present disclosure proposes a number of schemes pertaining to PDCP duplication handling with respect to the UE and the network apparatus. According to the implementations of the present disclosure, when the PDCP duplication is configured and activated, the UE may be able to choose a proper RLC entity to transmit PDCP control PDUs and calculate the data volume correctly. The receiver (e.g., network apparatus) may further be able to properly detect and discard duplicate PDUs.

Figure 1:
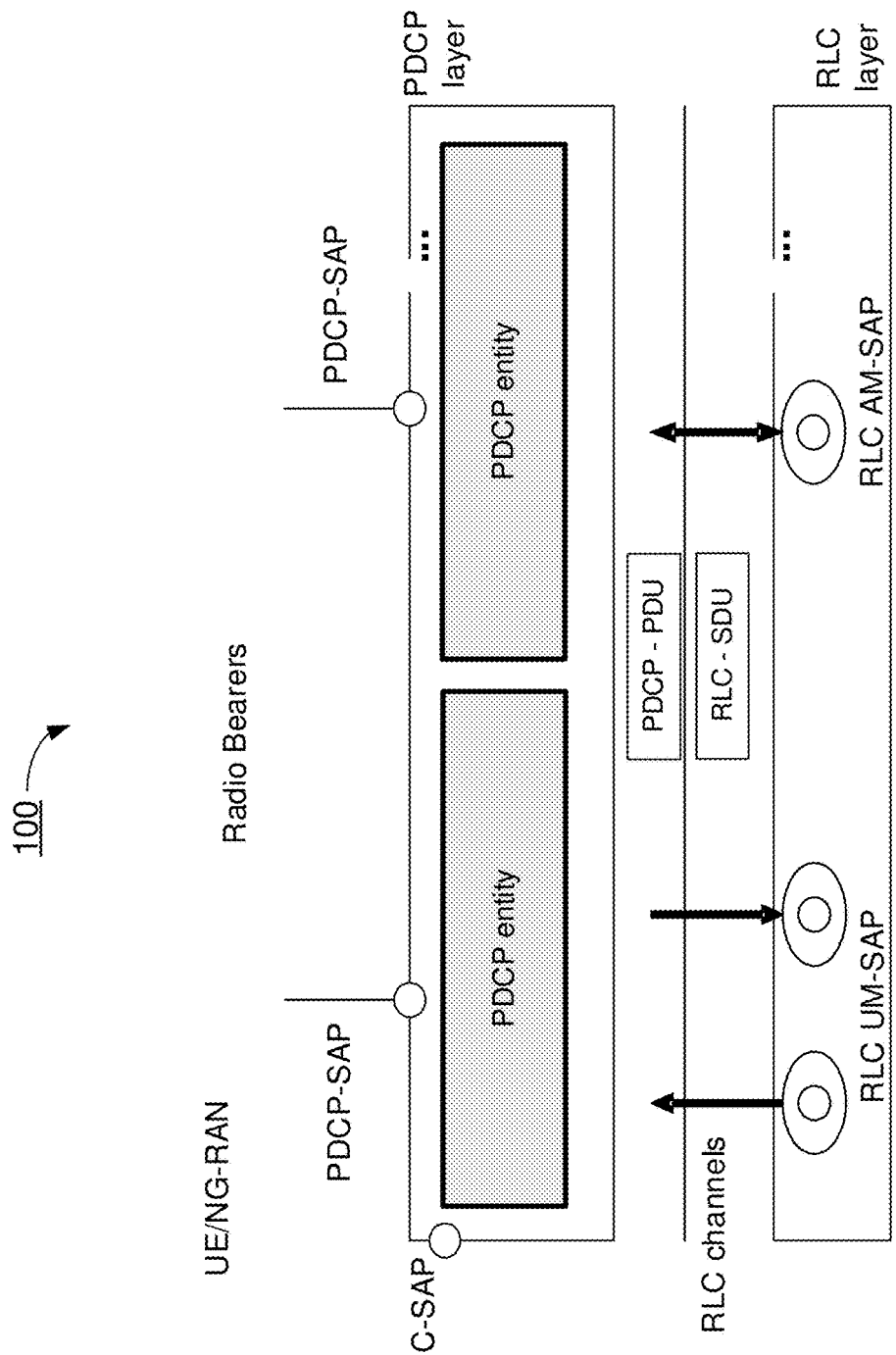
FIG. 1 is a diagram depicting an example scenario under schemes in accordance with implementations of the present disclosure.

FIG. 1 illustrates an example scenario 100 under schemes in accordance with implementations of the present disclosure. Scenario 100 involves a UE or a network apparatus, which may be a part of a wireless communication network (e.g., an LTE network, an LTE-Advanced network, an LTE-Advanced Pro network, a 5G network, an NR network, an IoT network or an NB-IoT network). FIG. 1 illustrates a structure view of the protocol layers in a transmitter or a receiver (e.g., UE or network apparatus). The protocol layers may comprise a PDCP layer, a RLC layer and a MAC layer. The PDCP layer may be used for radio bearers (RBs) mapping. Each RB may be associated with one PDCP entity. Each PDCP entity may be associated with one or more RLC entities depending on the RB characteristic or RLC mode. The PDCP entities are located in the PDCP layer. Several PDCP entities may be defined for a UE. Each PDCP entity may carry the data of one RB. A PDCP entity may be associated either to the control plane or the user plane depending on which radio bearer it is carrying data for.

The UE may be configured to determine whether the PDCP entity is associated with two RLC entities. The UE may further be configured to determine whether the PDCP duplication is configured and activated. In an event that the PDCP entity is associated with two RLC entities and the PDCP duplication is activated, the UE may be configured to determine whether a PDCP protocol data unit (PDU) is a PDCP data PDU or a PDCP control PDU. In an event that the PDCP PDU is a PDCP data PDU, the UE may be configured to duplicate the PDCP data PDU and transmit the PDCP data PDU to both associated RLC entities. In an event that the PDCP PDU is a PDCP control PDU, the UE may be configured to select one of the two RLC entities to transmit the PDCP control PDU. The PDCP control PDU may not be duplicated to both RLC entities.

For example, the two RLC entities may comprise a primary RLC entity and a secondary RLC entity. The UE may be configured to always select the primary RLC entity to transmit the PDCP control PDU in an event that the PDCP duplication is activated. The PDCP control PDU may not be duplicated to the secondary RLC entity. Alternatively, the UE may be configured to always select the secondary RLC entity to transmit the PDCP control PDU in an event that the PDCP duplication is activated. The PDCP control PDU may not be duplicated to the primary RLC entity.

In some implementations, the UE may be configured to select one of the two RLC entities according to a configuration from the network apparatus. The UE may receive a configuration from the network apparatus. The configuration may be determined by an operator or service provider. The configuration may be, for example and without limitations, a radio resource control (RRC) configuration. The RRC configuration may indicate the UE which RLC entity should be selected for PDCP control PDUs. The UE may select one of the two RLC entities according to the RRC configuration in an event that the PDCP duplication is activated.

In some implementations, the UE may be configured to select one of the two RLC entities according to the UE's implementation. The UE's implementation may be provided by the manufacturer of the UE. For example, the UE may select one of the two RLC entities according to a predetermined rule. The predetermined rule may be configured by the manufacturer of the UE and may be changeable.

In an event that the PDCP entity is associated with two RLC entities and the PDCP duplication is activated, when indicating the PDCP data volume to a MAC entity for buffer status report (BSR) and buffer size calculation, the UE may be configured to indicate a PDCP data volume to the MAC entity associated with the selected RLC entity. For example, the UE may indicate the PDCP data volume to the MAC entity associated with the primary RLC entity. Alternatively, the UE may be configured to indicate a PDCP data volume excluding the PDCP control PDU to the MAC entity associated with the unselected RLC entity. For example, the UE may indicate the PDCP data volume excluding the PDCP control PDU to the MAC entity associated with the secondary RLC entity.

For duplicate PDUs detection and discard, the UE may be configured to determine whether the PDCP duplication is activated. In an event that the PDCP duplication is activated, at the transmitter, the UE may be configured to add a sequence number to a first PDCP control PDU. The UE may transmit the first PDCP control PDU to the network apparatus. At the receiver, the UE may be configured to receive a second PDCP control PDU from the network apparatus. The UE may be configured to determine whether the second PDCP control PDU is a duplicate PDU according to a sequence number of the second PDCP control PDU. The UE may further be configured to discard the second PDCP control PDU in an event that the second PDCP control PDU is the duplicate PDU.

The PDCP control PDU may comprise a PDCP status report or an interspersed robust header compression (ROHC) feedback. The sequence number may be added to all PDCP control PDU formats including both the PDCP status report and the interspersed ROHC feedback. Alternatively, the sequence number may solely be added to some specific PDCP control PDU formats (e.g., the PDCP status report or the interspersed ROHC feedback). Alternatively, a new PDCP control PDU type with sequence number may also be introduced for the PDCP duplication. For example, a new PDCP status report with sequence number, a new interspersed ROHC feedback with sequence number, or both of these two types may be used to carrying the sequence number when the PDCP duplication is supported.

Accordingly, when the PDCP duplication is activated, the UE may be able to properly select one of multiple RLC entities to transmit the PDCP control PDU without duplicating to the multiple RLC entities. The signal overhead of the control plane may be reduced. The power consumption of the transmitting entity may also be reduced. Additionally, with the sequence number added to the PDCP control PDU, the receiver (e.g., UE or network apparatus) may be able to correctly detect and discard duplicated PDUs. This may facilitate data detection and improve performance at the receiver.

Illustrative Implementations

Figure 2:
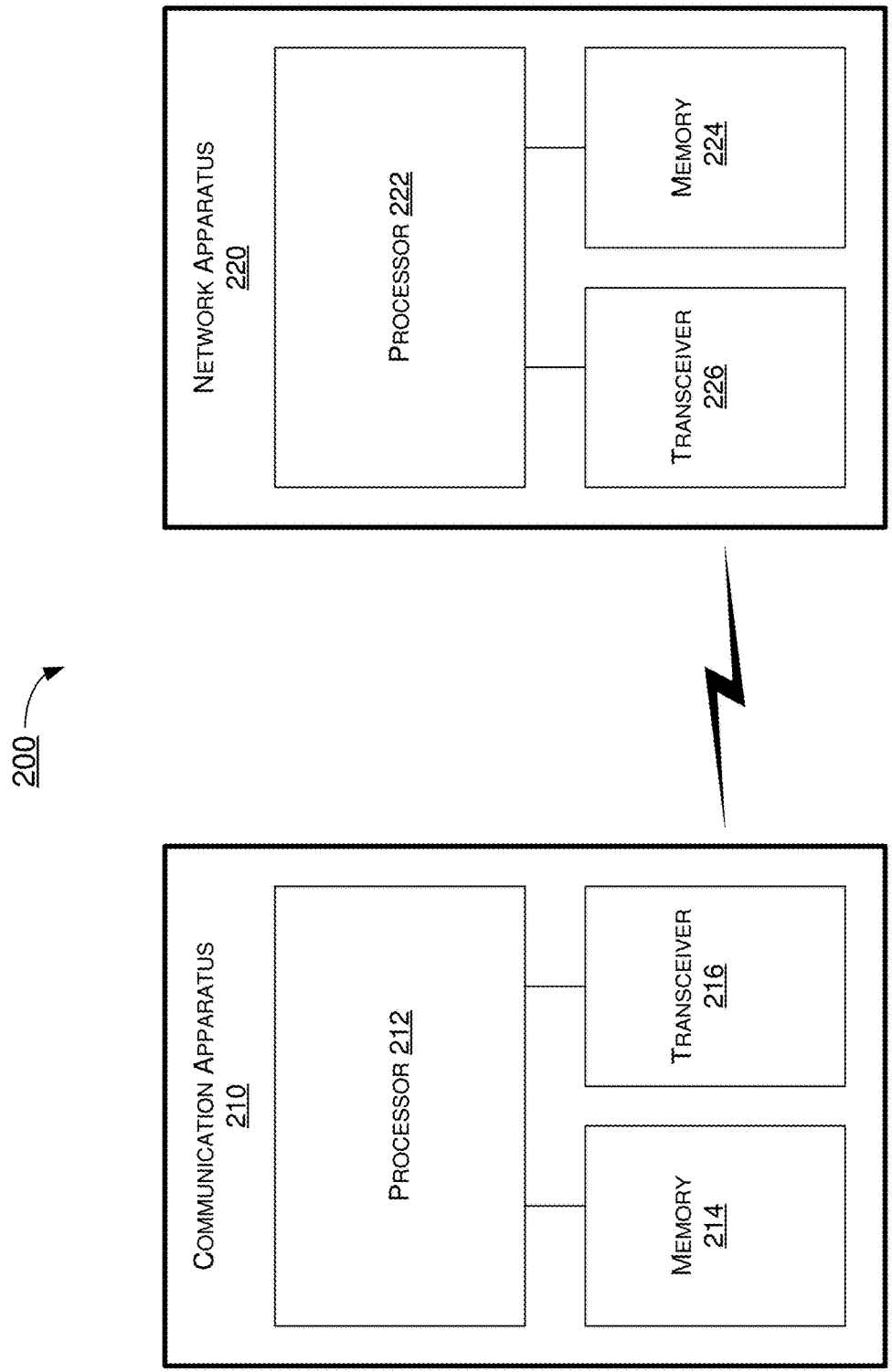
FIG. 2 is a block diagram of an example communication apparatus and an example network apparatus in accordance with an implementation of the present disclosure.

FIG. 2 illustrates an example communication apparatus 210 and an example network apparatus 220 in accordance with an implementation of the present disclosure. Each of communication apparatus 210 and network apparatus 220 may perform various functions to implement schemes, techniques, processes and methods described herein pertaining to PDCP duplication handling with respect to user equipment and network apparatus in wireless communications, including scenario 100 described above as well as processes 300 and 400 described below.

Communication apparatus 210 may be a part of an electronic apparatus, which may be a UE such as a portable or mobile apparatus, a wearable apparatus, a wireless communication apparatus or a computing apparatus. For instance, communication apparatus 210 may be implemented in a smartphone, a smartwatch, a personal digital assistant, a digital camera, or a computing equipment such as a tablet computer, a laptop computer or a notebook computer. Communication apparatus 210 may also be a part of a machine type apparatus, which may be an IoT or NB-IoT apparatus such as an immobile or a stationary apparatus, a home apparatus, a wire communication apparatus or a computing apparatus. For instance, communication apparatus 210 may be implemented in a smart thermostat, a smart fridge, a smart door lock, a wireless speaker or a home control center. Alternatively, communication apparatus 210 may be implemented in the form of one or more integrated-circuit (IC) chips such as, for example and without limitation, one or more single-core processors, one or more multi-core processors, one or more reduced-instruction set computing (RISC) processors, or one or more complex-instruction-set-computing (CISC) processors. Communication apparatus 210 may include at least some of those components shown in FIG. 2 such as a processor 212, for example. Communication apparatus 210 may further include one or more other components not pertinent to the proposed scheme of the present disclosure (e.g., internal power supply, display device and/or user interface device), and, thus, such component(s) of communication apparatus 210 are neither shown in FIG. 2 nor described below in the interest of simplicity and brevity.

Network apparatus 220 may be a part of an electronic apparatus, which may be a network node such as a base station, a small cell, a router or a gateway. For instance, network apparatus 220 may be implemented in an eNodeB in an LTE, LTE-Advanced or LTE-Advanced Pro network or in a gNB in a 5G, NR, IoT or NB-IoT network. Alternatively, network apparatus 220 may be implemented in the form of one or more IC chips such as, for example and without limitation, one or more single-core processors, one or more multi-core processors, or one or more RISC or CISC processors. Network apparatus 220 may include at least some of those components shown in FIG. 2 such as a processor 222, for example. Network apparatus 220 may further include one or more other components not pertinent to the proposed scheme of the present disclosure (e.g., internal power supply, display device and/or user interface device), and, thus, such component(s) of network apparatus 220 are neither shown in FIG. 2 nor described below in the interest of simplicity and brevity.

In one aspect, each of processor 212 and processor 222 may be implemented in the form of one or more single-core processors, one or more multi-core processors, or one or more RISC or CISC processors. That is, even though a singular term "a processor" is used herein to refer to processor 212 and processor 222, each of processor 212 and processor 222 may include multiple processors in some implementations and a single processor in other implementations in accordance with the present disclosure. In another aspect, each of processor 212 and processor 222 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 212 and processor 222 is a special-purpose machine specifically designed, arranged and configured to perform specific tasks including power consumption reduction in a device (e.g., as represented by communication apparatus 210) and a network (e.g., as represented by network apparatus 220) in accordance with various implementations of the present disclosure.

In some implementations, communication apparatus 210 may also include a transceiver 216 coupled to processor 212 and capable of wirelessly transmitting and receiving data. In some implementations, communication apparatus 210 may further include a memory 214 coupled to processor 212 and capable of being accessed by processor 212 and storing data therein. In some implementations, network apparatus 220 may also include a transceiver 226 coupled to processor 222 and capable of wirelessly transmitting and receiving data. In some implementations, network apparatus 220 may further include a memory 224 coupled to processor 222 and capable of being accessed by processor 222 and storing data therein. Accordingly, communication apparatus 210 and network apparatus 220 may wirelessly communicate with each other via transceiver 216 and transceiver 226, respectively. To aid better understanding, the following description of the operations, functionalities and capabilities of each of communication apparatus 210 and network apparatus 220 is provided in the context of a mobile communication environment in which communication apparatus 210 is implemented in or as a communication apparatus or a UE and network apparatus 220 is implemented in or as a network node of a communication network.

In some implementations, communication apparatus 210 may comprise protocol layers including a PDCP layer, a RLC layer and a MAC layer implemented by software or hardware in processor 212. Processor 212 may use the PDCP layer for RBs mapping. Each RB may be associated with one PDCP entity. Each PDCP entity may be associated with one or more RLC entities depending on the RB characteristic or RLC mode. The PDCP entities are located in the PDCP layer. Several PDCP entities may be defined for communication apparatus 210. Each PDCP entity may carry the data of one RB. A PDCP entity may be associated either to the control plane or the user plane depending on which radio bearer it is carrying data for.

In some implementations, processor 212 may be configured to determine whether the PDCP entity is associated with two RLC entities. Processor 212 may further be configured to determine whether the PDCP duplication is configured and activated. In an event that the PDCP entity is associated with two RLC entities and the PDCP duplication is activated, processor 212 may be configured to determine whether a PDCP PDU is a PDCP data PDU or a PDCP control PDU. In an event that the PDCP PDU is a PDCP data PDU, processor 212 may be configured to duplicate the PDCP data PDU and transmit the PDCP data PDU to both associated RLC entities. In an event that the PDCP PDU is a PDCP control PDU, processor 212 may be configured to select one of the two RLC entities to transmit the PDCP control PDU. Processor 212 may not duplicate the PDCP control PDU to both RLC entities.

In some implementations, the two RLC entities may comprise a primary RLC entity and a secondary RLC entity. Processor 212 may be configured to always select the primary RLC entity to transmit the PDCP control PDU in an event that the PDCP duplication is activated. Processor 212 may not duplicate the PDCP control PDU to the secondary RLC entity. Alternatively, processor 212 may be configured to always select the secondary RLC entity to transmit the PDCP control PDU in an event that the PDCP duplication is activated. Processor 212 may not duplicate the PDCP control PDU to the primary RLC entity.

In some implementations, processor 212 may be configured to select one of the two RLC entities according to a configuration from network apparatus 220. Processor 212 may receive, via transceiver 216, a configuration from network apparatus 220. The configuration may be determined by an operator or service provider. Network apparatus 220 may transmit the configuration via, for example and without limitations, an RRC configuration. The RRC configuration may indicate processor 212 which RLC entity should be selected for PDCP control PDUs. Processor 212 may select one of the two RLC entities according to the RRC configuration in an event that the PDCP duplication is activated.

In some implementations, processor 212 may be configured to select one of the two RLC entities according to the implementation of communication apparatus 210. The implementation of communication apparatus 210 may be provided by the manufacturer of communication apparatus 210. For example, processor 212 may select one of the two RLC entities according to a predetermined rule. The predetermined rule may be configured by the manufacturer of communication apparatus 210 and may be changeable.

In some implementations, in an event that the PDCP entity is associated with two RLC entities and the PDCP duplication is activated, when indicating the PDCP data volume to a MAC entity for BSR and buffer size calculation, processor 212 may be configured to indicate a PDCP data volume to the MAC entity associated with the selected RLC entity. For example, processor 212 may indicate the PDCP data volume to the MAC entity associated with the primary RLC entity. Alternatively, processor 212 may be configured to indicate a PDCP data volume excluding the PDCP control PDU to the MAC entity associated with the unselected RLC entity. For example, processor 212 may indicate the PDCP data volume excluding the PDCP control PDU to the MAC entity associated with the secondary RLC entity.

In some implementations, processor 212 may be configured to determine whether the PDCP duplication is activated. In an event that the PDCP duplication is activated, as a transmitter, processor 212 may be configured to add a sequence number to a first PDCP control PDU. Processor 212 may transmit, via transceiver 216, the first PDCP control PDU to network apparatus 220. As a receiver, processor 212 may be configured to receive a second PDCP control PDU from network apparatus 220. Processor 212 may be configured to determine whether the second PDCP control PDU is a duplicate PDU according to a sequence number of the second PDCP control PDU. Processor 212 may further be configured to discard the second PDCP control PDU in an event that the second PDCP control PDU is the duplicate PDU.

In some implementations, the PDCP control PDU may comprise a PDCP status report or an interspersed ROHC feedback. Processor 212 may add the sequence number to all PDCP control PDU formats including both the PDCP status report and the interspersed ROHC feedback. Alternatively, processor 212 may solely add the sequence number to some specific PDCP control PDU formats (e.g., the PDCP status report or the interspersed ROHC feedback). Alternatively, processor 212 may use a new PDCP control PDU type with sequence number for the PDCP duplication. For example, processor 212 may use a new PDCP status report with sequence number, a new interspersed ROHC feedback with sequence number, or both of these two types to carrying the sequence number when the PDCP duplication is supported.

Illustrative Processes

Figure 3:
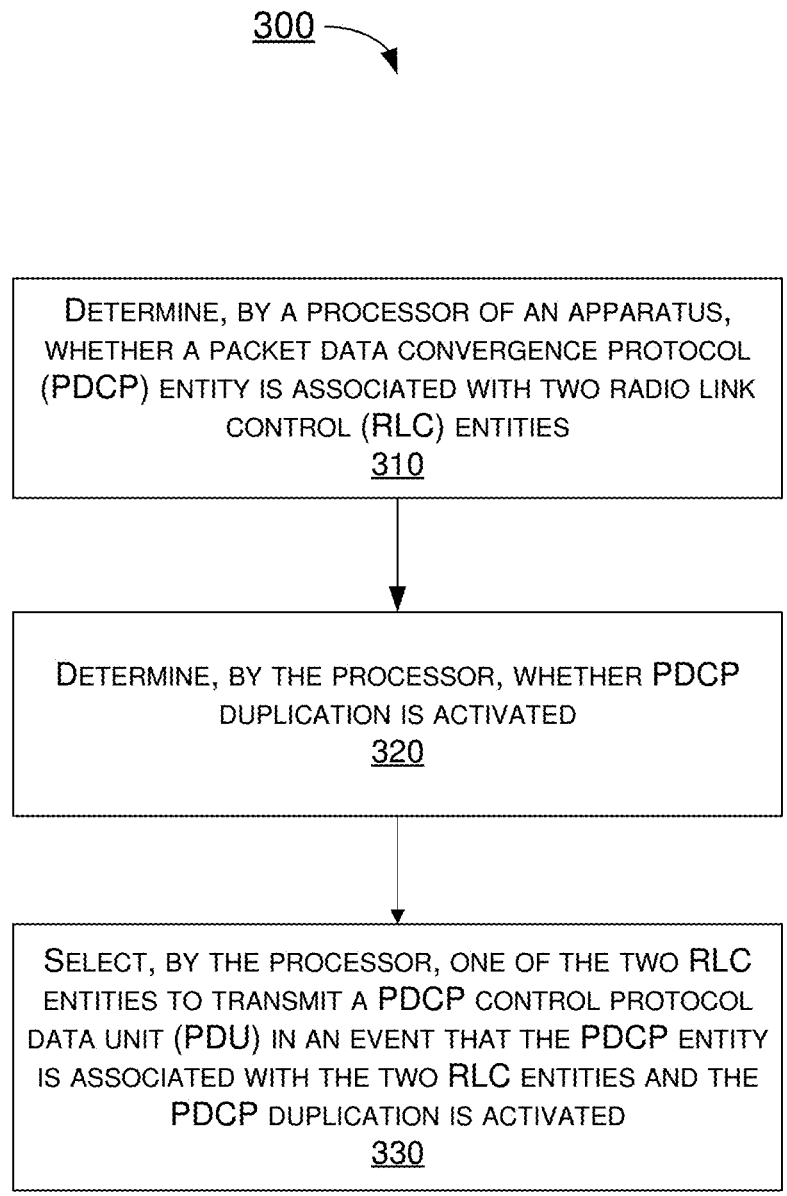
FIG. 3 is a flowchart of an example process in accordance with an implementation of the present disclosure.

FIG. 3 illustrates an example process 300 in accordance with an implementation of the present disclosure. Process 300 may be an example implementation of scenario 100, whether partially or completely, with respect to PDCP duplication handling in accordance with the present disclosure. Process 300 may represent an aspect of implementation of features of communication apparatus 210. Process 300 may include one or more operations, actions, or functions as illustrated by one or more of blocks 310, 320 and 330. Although illustrated as discrete blocks, various blocks of process 300 may be divided into additional blocks, combined into fewer blocks, or eliminated, depending on the desired implementation. Moreover, the blocks of process 300 may executed in the order shown in FIG. 3 or, alternatively, in a different order. Process 300 may be implemented by communication apparatus 210 or any suitable UE or machine type devices. Solely for illustrative purposes and without limitation, process 300 is described below in the context of communication apparatus 210. Process 300 may begin at block 310.

At 310, process 300 may involve processor 212 of apparatus 210 determining whether a PDCP entity is associated with two RLC entities. Process 300 may proceed from 310 to 320.

At 320, process 300 may involve processor 212 determining whether PDCP duplication is activated. Process 300 may proceed from 320 to 330.

At 330, process 300 may involve processor 212 selecting one of the two RLC entities to transmit a PDCP control PDU in an event that the PDCP entity is associated with the two RLC entities and the PDCP duplication is activated.

In some implementations, the selected RLC entity may comprise a primary RLC entity.

In some implementations, the selected RLC entity may comprise a secondary RLC entity.

In some implementations, process 300 may involve processor 212 selecting one of the two RLC entities according to a configuration from a network node.

In some implementations, process 300 may involve processor 212 selecting one of the two RLC entities according to a predetermined rule.

In some implementations, process 300 may involve processor 212 indicating a PDCP data volume to a MAC entity associated with the selected RLC entity.

In some implementations, process 300 may involve processor 212 indicating a PDCP data volume excluding the PDCP control PDU to a MAC entity associated with the unselected RLC entity.

Figure 4:
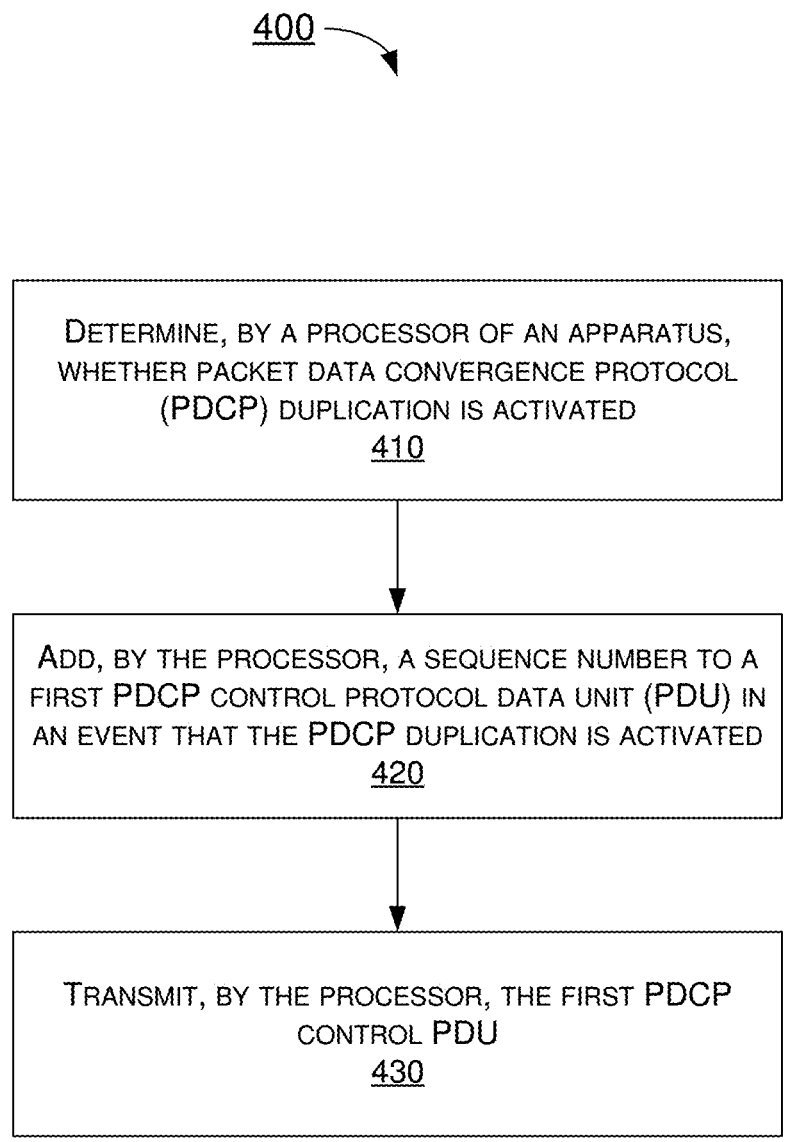
FIG. 4 is a flowchart of an example process in accordance with an implementation of the present disclosure.

FIG. 4 illustrates an example process 400 in accordance with an implementation of the present disclosure. Process 400 may be an example implementation of scenario 100, whether partially or completely, with respect to PDCP duplication handling in accordance with the present disclosure. Process 400 may represent an aspect of implementation of features of communication apparatus 210. Process 400 may include one or more operations, actions, or functions as illustrated by one or more of blocks 410, 420 and 430. Although illustrated as discrete blocks, various blocks of process 400 may be divided into additional blocks, combined into fewer blocks, or eliminated, depending on the desired implementation. Moreover, the blocks of process 400 may executed in the order shown in FIG. 4 or, alternatively, in a different order. Process 400 may be implemented by communication apparatus 210 or any suitable UE or machine type devices. Solely for illustrative purposes and without limitation, process 400 is described below in the context of communication apparatus 210. Process 400 may begin at block 410.

At 410, process 400 may involve processor 212 of apparatus 210 determining whether PDCP duplication is activated. Process 400 may proceed from 410 to 420.

At 420, process 400 may involve processor 212 adding a sequence number to a first PDCP control PDU in an event that the PDCP duplication is activated. Process 400 may proceed from 420 to 430.

At 430, process 400 may involve processor 212 transmitting the first PDCP control PDU.

In some implementations, the first PDCP control PDU may comprise a PDCP status report or an interspersed ROHC feedback.

In some implementations, process 400 may involve processor 212 receiving a second PDCP control PDU. Process 400 may also involve processor 212 determining whether the second PDCP control PDU is a duplicate PDU according to a sequence number of the second PDCP control PDU. Process 400 may further involve processor 212 discarding the second PDCP control PDU in an event that the second PDCP control PDU is the duplicate PDU.

In some implementations, the second PDCP control PDU may comprise a PDCP status report or an interspersed ROHC feedback.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:
   determining, by a processor of an apparatus, whether a packet data convergence protocol (PDCP) entity is associated with two radio link control (RLC) entities;
   determining, by the processor, whether PDCP duplication is activated;
   selecting, by the processor, one of the two RLC entities to transmit a PDCP control protocol data unit (PDU) in an event that the PDCP entity is associated with the two RLC entities and the PDCP duplication is activated;
   transmitting, by the processor, the PDCP control PDU via the selected RLC entity;
   calculating, by the processor, a PDCP data volume; and
   indicating, by the processor, the PDCP data volume to a medium access control (MAC) entity,
   wherein the indicating of the PDCP data volume comprises indicating the PDCP data volume excluding the PDCP control PDU to a MAC entity associated with an unselected RLC entity.

2. The method of claim 1, wherein the selected RLC entity comprises a primary RLC entity.

3. The method of claim 1, wherein the selected RLC entity comprises a secondary RLC entity.

4. The method of claim 1, wherein the selecting comprises selecting one of the two RLC entities according to a configuration from a network node.

5. The method of claim 1, wherein the selecting comprises selecting one of the two RLC entities according to a predetermined rule.

6. The method of claim 1, wherein the indicating of the PDCP data volume comprises indicating the PDCP data volume to a MAC entity associated with the selected RLC entity.

7. An apparatus, comprising:
   a transceiver capable of wirelessly communicating with a network node of a wireless network; and
   a processor communicatively coupled to the transceiver, the processor capable of:
      determining whether a packet data convergence protocol (PDCP) entity is associated with two radio link control (RLC) entities;
      determining whether PDCP duplication is activated;
         selecting one of the two RLC entities to transmit a PDCP control protocol data unit (PDU) in an event that the PDCP entity is associated with the two RLC entities and the PDCP duplication is activated;
         transmitting, by the processor, the PDCP control PDU via the selected RLC entity;
         calculating, by the processor, a PDCP data volume; and indicating, by the processor, the PDCP data volume to a medium access control (MAC) entity,
         wherein, in indicating the PDCP data volume, the processor indicates the PDCP data volume excluding the PDCP control PDU to a MAC entity associated with an unselected RLC entity.

8. The apparatus of claim 7, wherein the selected RLC entity comprises a primary RLC entity.

9. The apparatus of claim 7, wherein the selected RLC entity comprises a secondary RLC entity.

10. The apparatus of claim 7, wherein, in selecting one of the two RLC entities, the processor is capable of selecting one of the two RLC entities according to a configuration from the network node.

11. The apparatus of claim 7, wherein, in selecting one of the two RLC entities, the processor is capable of selecting one of the two RLC entities according to a predetermined rule.

12. The apparatus of claim 7, wherein, in indicating the PDCP data volume, the processor is capable of: indicating the PDCP data volume to a MAC entity associated with the selected RLC entity.

* * * * *